(12) United States Patent
Zhang et al.

(10) Patent No.: US 9,962,055 B2
(45) Date of Patent: May 8, 2018

(54) MUTE OPERATION METHOD AND APPARATUS FOR AUTOMATIC CLEANING DEVICE

(71) Applicant: Xiaomi Inc., Beijing (CN)

(72) Inventors: Pengfei Zhang, Beijing (CN); Yongfeng Xia, Beijing (CN); Heng Qu, Beijing (CN); Tiejun Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 15/224,183

(22) Filed: Jul. 29, 2016

(65) Prior Publication Data

US 2017/0020356 A1  Jan. 26, 2017

Related U.S. Application Data

(63) Continuation-in-part of application No. PCT/CN2015/078117, filed on Apr. 30, 2015.

(30) Foreign Application Priority Data

Dec. 3, 2014  (CN) .......................... 2014 1 0729768

(51) Int. Cl.
*A47L 11/40* (2006.01)
*G05D 1/02* (2006.01)
(Continued)

(52) U.S. Cl.
CPC ......... *A47L 11/4097* (2013.01); *A47L 9/0081* (2013.01); *A47L 11/4011* (2013.01);
(Continued)

(58) Field of Classification Search
CPC .............. A47L 9/0081; A47L 2201/04; A47L 11/4011; A47L 11/4097; G05D 1/0219;
(Continued)

(56) References Cited

U.S. PATENT DOCUMENTS

2005/0188493 A1  9/2005  Uehigashi
2009/0198380 A1*  8/2009  Friedman ................ A47L 9/009
                                                            700/259
(Continued)

FOREIGN PATENT DOCUMENTS

CN  201710284 U  1/2011
JP  H3-39129  2/1991
(Continued)

OTHER PUBLICATIONS

Extended European Search Report dated Apr. 25, 2016 for European Application No. 15184583.1, 6 pages.
(Continued)

*Primary Examiner* — Alexander Markoff
(74) *Attorney, Agent, or Firm* — Brinks, Gilson & Lione

(57) ABSTRACT

The present disclosure relates to a mute operation method and a mute operation apparatus for an automatic cleaning device, the mute operation method includes: receiving a mute instruction; planning a mute cleaning path according to the mute instruction; switching to a mute mode and performing a cleaning operation according to the mute cleaning path.

14 Claims, 10 Drawing Sheets

(51) Int. Cl.
*A47L 9/00* (2006.01)
*G05B 19/04* (2006.01)
*G05B 19/409* (2006.01)

(52) U.S. Cl.
CPC ......... *G05B 19/041* (2013.01); *G05B 19/409* (2013.01); *G05D 1/0217* (2013.01); *G05D 1/0219* (2013.01); *A47L 2201/04* (2013.01); *G05B 2219/37337* (2013.01); *G05D 2201/0215* (2013.01)

(58) Field of Classification Search
CPC ......... G05D 2201/0215; G05D 1/0217; G05D 19/409; G05D 2219/37337; G05D 19/041
See application file for complete search history.

(56) References Cited

U.S. PATENT DOCUMENTS

| | | | | |
|---|---|---|---|---|
| 2013/0253701 | A1* | 9/2013 | Halloran | A47L 5/30 700/245 |
| 2014/0207282 | A1* | 7/2014 | Angle | H04L 12/282 700/257 |
| 2014/0362210 | A1* | 12/2014 | Huang | G08C 17/02 348/114 |
| 2015/0250372 | A1* | 9/2015 | T P | A47L 9/2826 701/28 |

FOREIGN PATENT DOCUMENTS

| | | |
|---|---|---|
| JP | 2000-175275 A | 6/2000 |
| JP | 2000-197599 A | 7/2000 |
| JP | 2001-211680 A | 8/2001 |
| JP | 2005-211498 A | 8/2005 |
| JP | 2007-159609 A | 6/2007 |
| JP | 2013-169221 A | 9/2013 |
| JP | 2013-169225 A | 9/2013 |
| JP | 2013-230294 A | 11/2013 |

OTHER PUBLICATIONS

International Search Report and Written Opinion dated Sep. 14, 2015 for International Application No. PCT/CN2015/078117, 13 pages.

Office Action dated Jan. 27, 2017 for Japanese Application No. 2016-562059, 6 pages.

Office Action dated Aug. 18, 2016 for Korean Application No. 10-2015-7027030, 6 pages.

Office Action dated Feb. 27, 2017 for Korean Application No. 10-2015-7027030, 4 pages.

* cited by examiner

MUTE OPERATION METHOD AND APPARATUS FOR AUTOMATIC CLEANING DEVICE

PRIORITY STATEMENT

This application is a Continuation-In-Part of International Application No. PCT/CN2015/078117, filed with the State Intellectual Property Office of P. R. China on Apr. 30, 2015, which is based upon and claims priority to Chinese Patent Application No. 201410729768.2, filed on Dec. 3, 2014, the contents of which are incorporated herein by reference.

TECHNICAL FIELD

The present disclosure relates to an automatic cleaning field, and more particularly, to a method for conducting a mute operation on a cleaning device, and a mute operation apparatus for an automatic cleaning device.

BACKGROUND

With the development of smart appliance technology, various automatic cleaning devices appear, such as an automatic vacuum cleaning robot, an automatic mopping robot, etc. The automatic cleaning devices may perform a cleaning operation automatically, which is convenient for a user. Taking the automatic vacuum cleaning robot as an example, a place is cleaned automatically using a technology such as a direct brushing, a vacuum cleaning, etc.

However, the automatic cleaning devices may make a big noise during operation, thus affecting the user's normal life.

SUMMARY

The present disclosure provides a method for conducting a mute operation on a cleaning device, and a mute operation apparatus for an automatic cleaning device to solve the technical problem in the related art.

According to an aspect of the present disclosure, a hardware module may comprise a processor-readable storage medium, including a set of instructions for conducting a mute operation on a cleaning device; and a processor in communication with the storage medium. When executing the set of instructions, the processor is directed to: receive a mute instruction to operate the cleaning device in a mute mode; determine a mute cleaning path for an cleaning operation to clean an object according to the mute instruction; set the cleaning device to a mute mode; and direct the cleaning device to perform the cleaning operation to the object according to the mute cleaning path.

According to another aspect of the present disclosure, a method for conducting a mute operation on a cleaning device may comprise receiving, by a hardware module of a cleaning device, a mute instruction to operate the cleaning device in a mute mode; determining, by the hardware module, a mute cleaning path for an cleaning operation to clean an object according to the mute instruction; setting, by the hardware module, the cleaning device to a mute mode; and directing, by the hardware module the cleaning device to perform the cleaning operation to the object according to the mute cleaning path.

According to yet another aspect of the present disclosure, a non-transitory, processor-readable storage medium may comprise a set of instructions for conducting a mute operation on a cleaning device. When executed by a processor of hardware module of a cleaning device, the set of instructions directs the hardware module to perform acts of: receiving a mute instruction to operate the cleaning device in a mute mode; determining a mute cleaning path for an cleaning operation to clean an object according to the mute instruction; setting the cleaning device to a mute mode; and directing the cleaning device to perform the cleaning operation to the object according to the mute cleaning path.

The technical solutions provided in embodiments of the present disclosure may have advantageous effects as follows.

With the technical solutions of the present disclosure, by receiving a mute instruction and switching to a mute mode, a noise made during operation may be reduced and an impact on a user may be avoided; meanwhile, by planning a mute cleaning path applied in the mute mode and adjusting a cleaning path, an impact of the mute mode on the cleaning effect may be avoided.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 16:
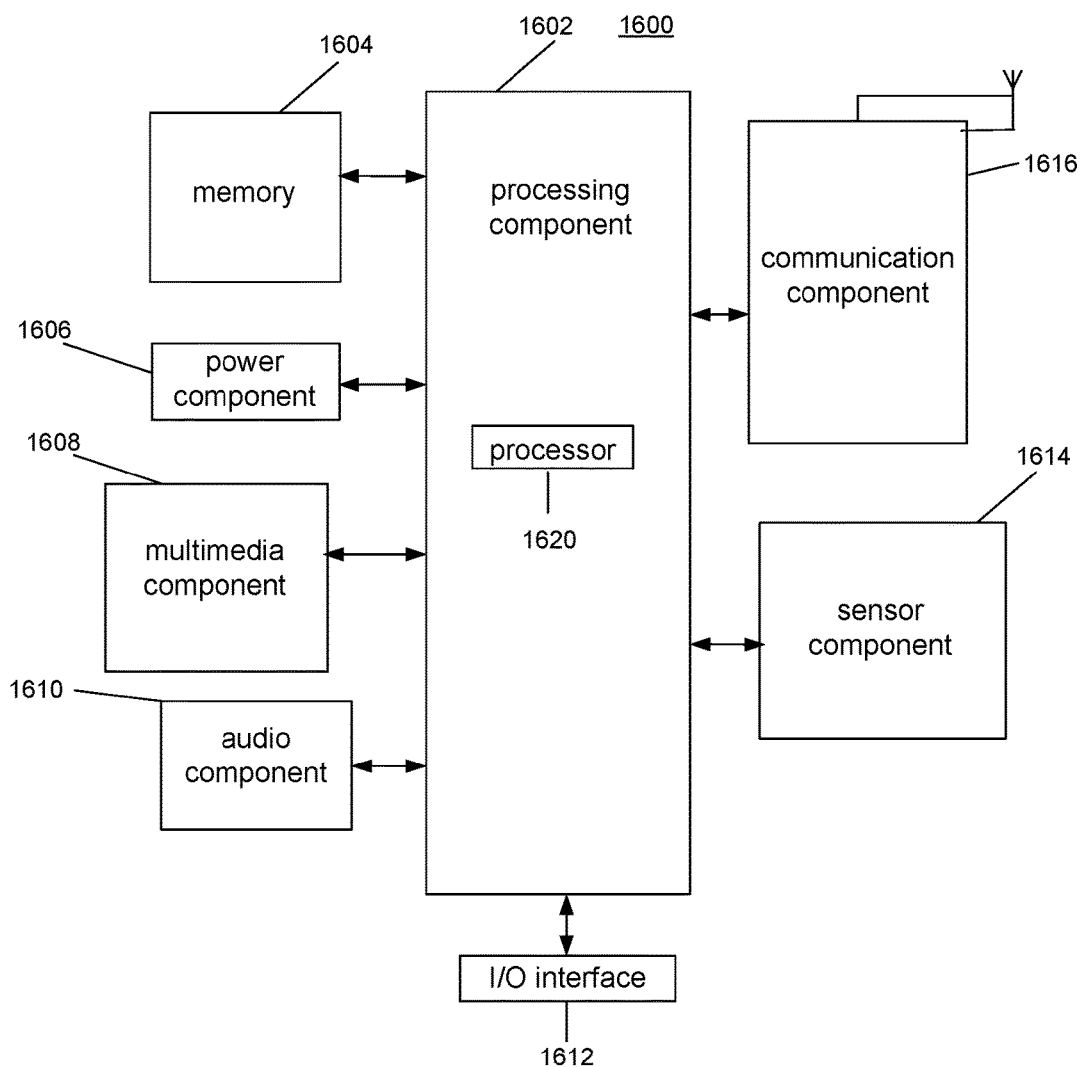
FIG. 16 is a block diagram illustrating a mute operation device for an automatic cleaning device according to an exemplary embodiment.

FIG. 16 is a block diagram of a mute operation device 1600 for an automatic cleaning device according to an exemplary embodiment. For example, the device 1600 may be a controller apparatus and/or module installed in a smart home appliance. For example, the controller apparatus may be a computer device. Or the device 1600 may be a mobile phone, a computer, a digital broadcast terminal, a messaging device, a gaming console, a tablet, a medical device, an exercise equipment, a personal digital assistant, and the like.

The device 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 generally controls overall operations of the device 1600, such as the operations associated with display, telephone calls, data communications, camera operations, and recording operations. The processing component 1602 may include one or more processors 1620 to execute instructions to perform all or part of the steps in the above described methods. Moreover, the processing component 1602 may include one or more modules which facilitate the interaction between the processing component 1602 and other components. For instance, the processing component 1602 may include a multimedia module to facilitate the interaction between the multimedia component 1608 and the processing component 1602.

The memory 1604 is configured to store various types of data to support the operation of the device 1600. Examples of such data include instructions for any applications or methods operated on the device 1600, contact data, phonebook data, messages, pictures, videos, etc. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the device 1600. The power component 1606 may include a power management system, one or more power sources, and any other components associated with the generation, management, and distribution of power in the device 1600.

The multimedia component 1608 may include a screen providing an output interface between the device 1600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 may include a front camera and/or a rear camera. The front camera and the rear camera may receive an external multimedia datum while the device 1600 is in an operation mode, such as a photograph-ing mode or a video mode. Each of the front camera and the rear camera may be a fixed optical lens system or have focus and optical zoom capability.

The audio component 1610 may be configured to output and/or input audio signals. For example, the audio component 1610 includes a microphone ("MIC") configured to receive an external audio signal when the device 1600 is in an operation mode, such as a call mode, a recording mode, and a voice recognition mode. The received audio signal may be further stored in the memory 1604 or transmitted via the communication component 1616. In some embodiments, the audio component 1610 further includes a speaker to output audio signals.

The I/O interface 1612 provides an interface between the processing component 1602 and peripheral interface modules. For example, the I/O interface 1612 may be a hardware device to connect the device 1600 with a smart home appliance, such as an automatic cleaning device. The I/O interface 1612 may also be a keyboard, a click wheel, buttons, and the like. The buttons may include, but are not limited to, a home button, a volume button, a starting button, and a locking button.

The sensor component 1614 includes one or more sensors to provide status assessments of various aspects of the device 1600. For instance, the sensor component 1614 may detect an open/closed status of the device 1600, relative positioning of components, e.g., the display and the keypad, of the device 1600, a change in position of the device 1600 or a component of the device 1600, a presence or absence of user contact with the device 1600, an orientation or an acceleration/deceleration of the device 1600, and a change in temperature of the device 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an accelerometer sensor, a gyroscope sensor, a magnetic sensor, a pressure sensor, or a temperature sensor.

The communication component 1616 is configured to facilitate communication, wired or wirelessly, between the device 1600 and other devices. The device 1600 can access a wireless network based on a communication standard, such as WiFi, 2G, or 3G, or a combination thereof. In one exemplary embodiment, the communication component 1616 receives a broadcast signal or broadcast associated information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1604, executable by the processor 1620 in the device 1600, for performing the below-described methods. For example, the non-transitory computer-readable storage medium may be a ROM, a RAM, a CD-ROM, a magnetic tape, a floppy disc, an optical data storage device, and the like.

Figure 1:
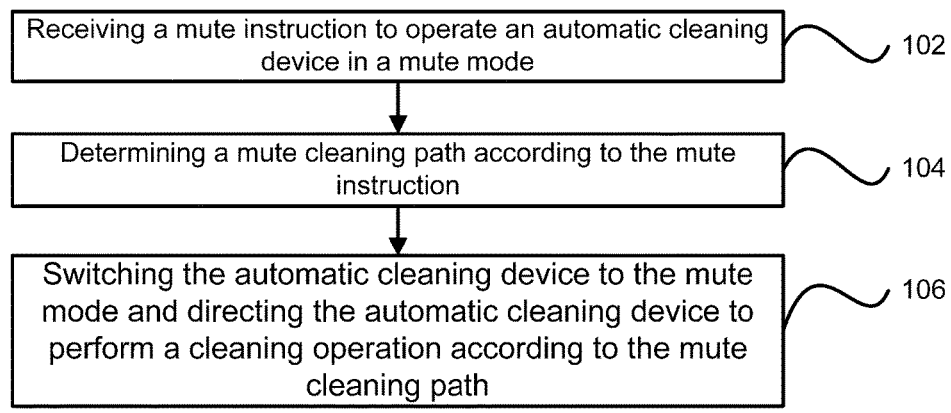
FIG. 1 is a flow chart showing a method for conducting a mute operation on an automatic cleaning device according to an exemplary embodiment.

FIG. 1 is a flow chart showing a method for conducting a mute operation on a cleaning device according to an exemplary embodiment, The method may be implemented as a set of instructions of an application in a storage medium of a hardware module. The hardware module may be implemented in an automatic cleaning device. A processor of the hardware module may communicate with the storage medium, execute the set of instructions, and perform operations of the method. The operations may include the following steps:

In step 102, the hardware module receives a mute instruction to operate an automatic cleaning device in a mute mode.

In this embodiment, the mute instruction may be directly inputted by a user, for example, the user clicks a "mute mode" button on the automatic cleaning device or sends a signal for switching to a "mute mode" to the automatic cleaning device via a remote control, an intelligent device or other devices associated with the automatic cleaning device, for example, the intelligent device may be a smart phone.

In this embodiment, the mute instruction may also be generated automatically by a control unit of the automatic cleaning device. The control unit may be the hardware module or may be a different module of the automatic cleaning device. For example, in an exemplary implementation, the mute instruction may be generated according to a relative distance between the user and the automatic cleaning device, i.e., the mute instruction may be generated when the automatic cleaning is close enough to the user; or as another exemplary implementation, the mute instruction may be generated according to a detected user status, for example, the mute instruction may be generated when the user is in a sleeping status, a watching TV status, etc.

In this embodiment, the automatic cleaning device may include an automatic vacuum cleaning robot, an automatic sweeping robot, an automatic mopping robot, an automatic window cleaning robot and other various devices which may realize an automatic cleaning function.

In step 104, the hardware module determines a mute cleaning path for a cleaning operation to clean an object according to the mute instruction.

The object to be cleaned may be a floor. In this embodiment, according to the received mute instruction, the hardware module determines what is needed to be done for the automatic cleaning device in order to switch to the mute mode. For example, to realize a "mute" effect, the hardware module may determine to reduce noise when the automatic cleaning device is in operation. To this end, the hardware module may determine to reduce the power of the automatic cleaning device when the cleaning device is in cleaning operation. Correspondingly, the hardware module may also determine a cleaning path (i.e., the mute cleaning path) under the mute mode. An optimization of the cleaning path of the automatic cleaning device may be conducted by the hardware module in order to reduce the impact caused by the power reduction and maintain the same quality of cleaning operation as in the normal working mode.

In step 106, the hardware module switches and/or set the automatic cleaning device to the mute mode and directs the automatic cleaning device to perform a cleaning operation to the object according to the mute cleaning path.

From the above-described embodiments, with the technical solutions of the preset disclosure, by receiving a mute instruction and switching to a mute mode, a noise made during operation may be reduced and an impact on a user may be avoided; meanwhile, by planning a mute cleaning path applied in the mute mode and adjusting a cleaning path, an impact of the mute mode on the cleaning effect may be avoided.

Figure 2:
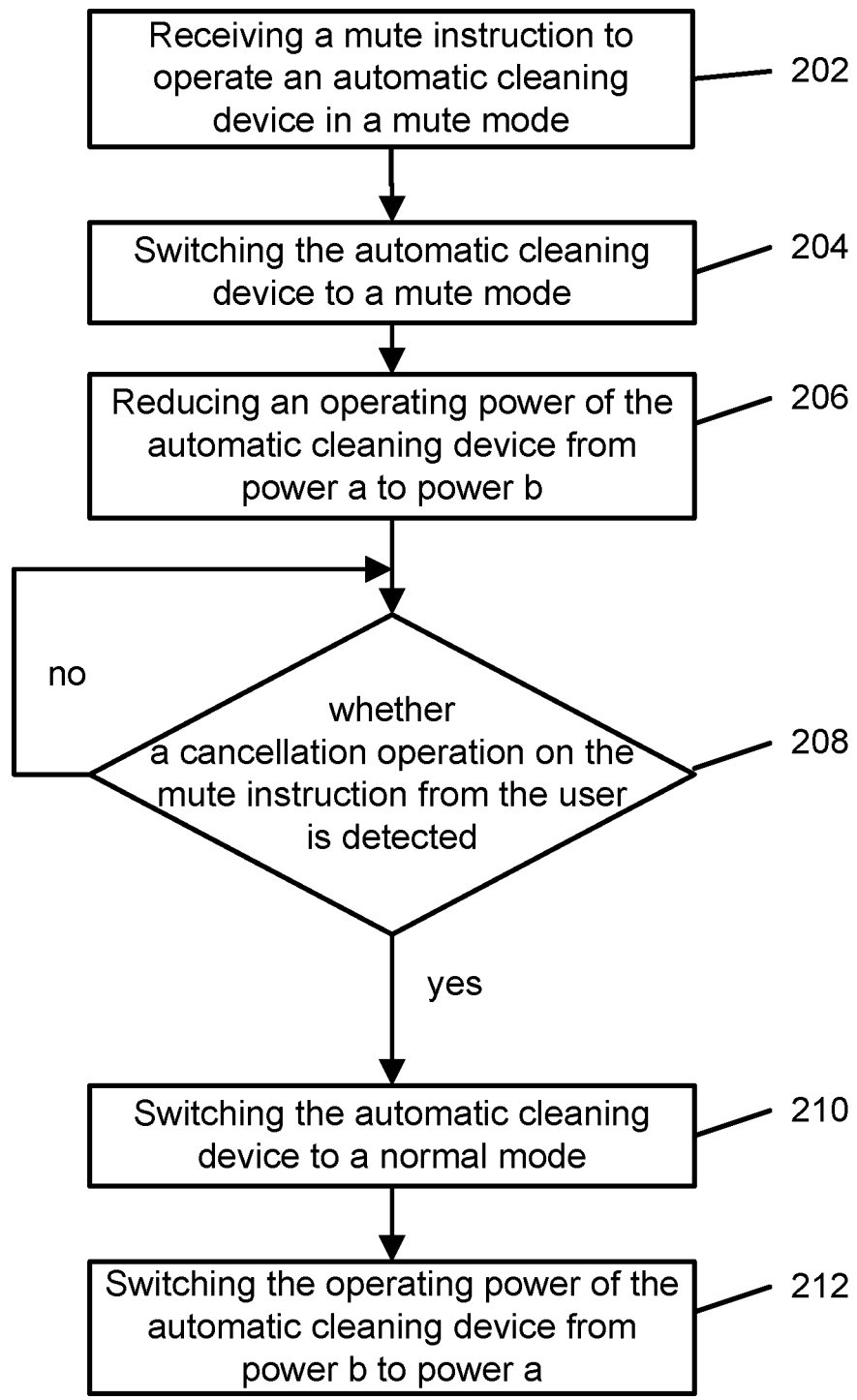
FIG. 2 is a flow chart showing another method for conducting a mute operation on a cleaning device according to an exemplary embodiment.

FIG. 2 is a flow chart showing another method for conducting a mute operation on a cleaning device according to an exemplary embodiment. The method may be implemented as a set of instructions of an application in a storage medium of a hardware module. The hardware module may be implemented in an automatic cleaning device. A processor of the hardware module may communicate with the storage medium, execute the set of instructions, and perform operations of the method. The operations may include the following steps:

In step 202, the hardware module receives a mute instruction inputted by a user.

In this embodiment, the user may operate on the automatic cleaning device or send a control signal via a remote control or an intelligent device connected to the automatic cleaning device to generate the mute instruction.

In step 204, the hardware module switches the automatic cleaning device to a mute mode according to the received mute instruction.

In step 206, in the mute mode, the hardware module reduces an operating power of the automatic cleaning device from power a to power b (a>b). Here, power b may be a power that the automatic cleaning device requires when working in the normal cleaning mode.

In this embodiment, by reducing the power, a device operating frequency and/or an amplitude in the automatic cleaning device is reduced, thus reducing a resulting noise due to the cleaning operation and thereby realizing a "mute" effect to the automatic cleaning device.

In step 208, the hardware module determines whether a cancellation operation on the mute instruction from the user is detected and/or received. If the cancellation operation on the mute instruction from the user is detected, step 210 is executed; else the mute mode is maintained.

In this embodiment, if the user actively inputs the mute instruction into the automatic cleaning device, a subjective expectation that the user wants the automatic cleaning device to operate in the mute mode is reflected, thus the mute mode may be maintained as long as the user does not cancel the mute instruction.

In step 210, the hardware module switches the automatic cleaning device to a normal mode based on the cancellation operation on the mute instruction from the user.

In step 212, in the normal mode, the operating power is recovered from power b to power a by the automatic cleaning device.

Figure 3:
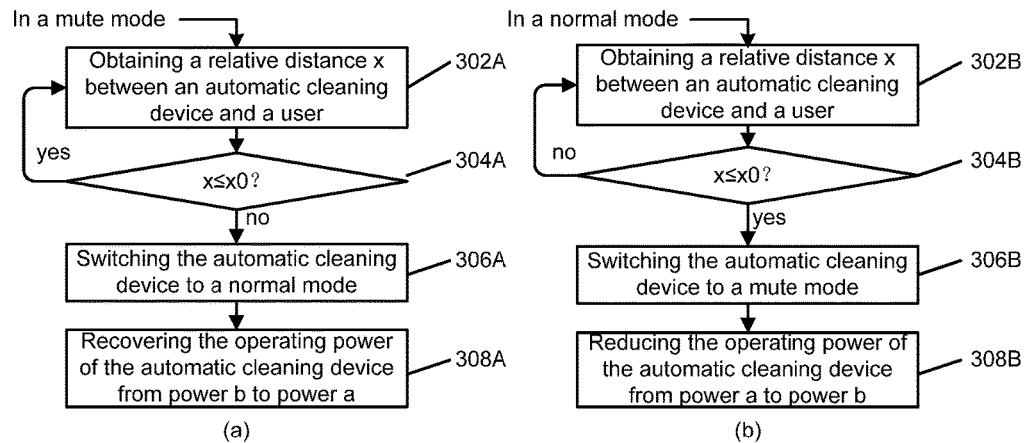
FIG. 3 is a flow chart showing another method for conducting a mute operation on a cleaning device according to an exemplary embodiment.

FIG. 3 is a flow chart showing another method for conducting a mute operation on a cleaning device according to an exemplary embodiment. The method may be implemented as a set of instructions of an application in a storage medium of a hardware module. The hardware module may be implemented in an automatic cleaning device. A processor of the hardware module may communicate with the storage medium, execute the set of instructions, and perform operations of the method. The operations may include the following steps:

1) When the automatic cleaning device is in a mute mode initially, as shown in FIG. 3(*a*).

In step 302A, the hardware module obtains a relative distance x between the automatic cleaning device and a user.

In this embodiment, the relative distance x between the automatic cleaning device and the user may be obtained by various ways. For example, the relative direction of the user may be determined by sound, light, a face recognition, etc., and then a ranging operation in the direction is performed (for example via infrared, ultrasonic, etc.) by the automatic cleaning device to obtain the relative distance x.

In step 304A, the hardware module determines whether the relative distance x is less than or equal to a preset distance x0. If the relative distance x is less than or equal to the preset distance x0, the mute mode is maintained and step 302A is executed, else step 306A is executed.

In step 306A, the hardware module switches the automatic cleaning device to a normal mode or directs the automatic cleaning device to switch to the normal mode.

In step 308A, in the normal mode, the hardware module recovers and/or increases the operating power of the automatic cleaning device from power b to power a or directs the automatic cleaning device to recover and/or increase the operating power from power b to power a.

2) When the automatic cleaning device is in a normal mode initially, as shown in FIG. 3(*b*).

In step 302B, the hardware module obtains a relative distance x between the automatic cleaning device and the user.

In step 304B, the hardware determines whether the relative distance x is less than or equal to a preset distance x0. If the relative distance x is less than or equal to the preset distance x0, step 306B is executed, else the normal mode is maintained and step 302B is executed.

In step 306B, the hardware module switches the automatic cleaning device to a mute mode or directs the automatic cleaning device to switch to the mute mode.

In step 308B, in the mute mode, the hardware module reduces the operating power of the automatic cleaning device from power a to power b or directs the automatic cleaning device to reduce its operation power from power a to power b.

Figure 4:
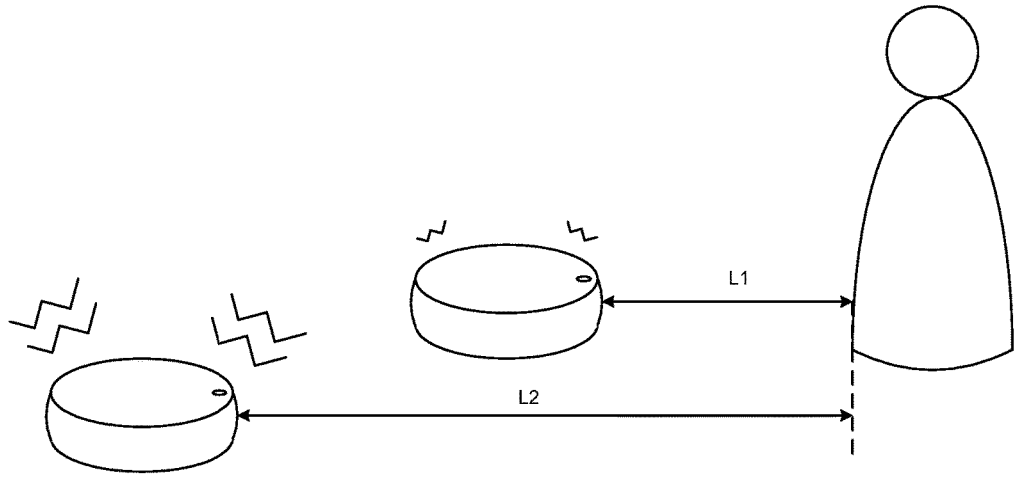
FIG. 4 is a schematic diagram illustrating a distance caused operation mode adjustment of a cleaning device according to an exemplary embodiment.

As an example of the above-described embodiment, FIG. 4 is a schematic diagram illustrating a distance caused operation mode adjustment of an automatic vacuum cleaning robot. The hardware module of the automatic vacuum cleaning robot may first determine and/or detect the relative distance x to a user. When the relative distance x=L1 and L1<x0, the hardware module may direct the automatic vacuum cleaning robot to switch to (or to maintain) a mute mode and determine a corresponding mute cleaning path for a mute vacuum cleaning; When the relative distance x=L2 and L2>x0, the hardware module may direct the automatic vacuum cleaning robot to switch to (or to maintain) the normal mode and adopt a preset original cleaning path to realize a normal vacuum cleaning.

The hardware module of the automatic vacuum cleaning robot may detect and/or determine the relative distance x in real time during operation, and directs the automatic vacuum cleaning to switch between the mute mode and the normal mode in real time according to a detected and/or determined result.

Figure 5:
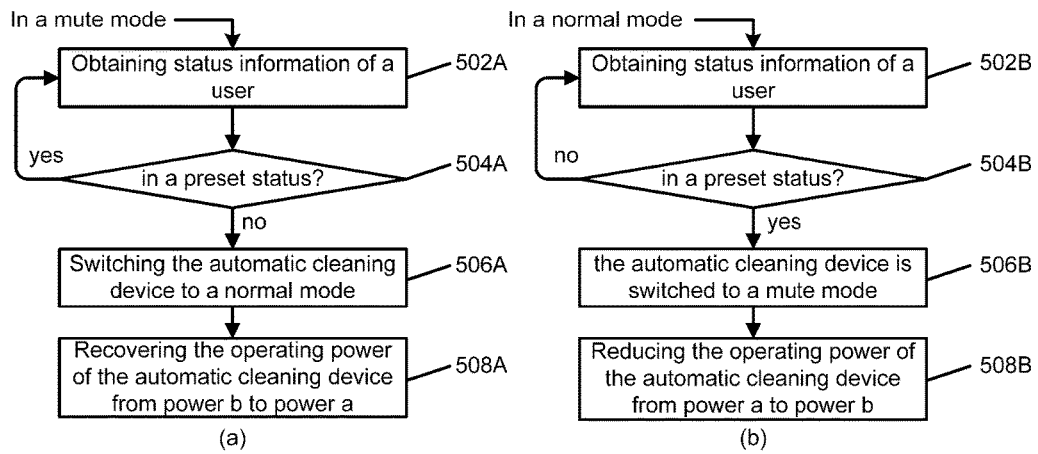
FIG. 5 is a flow chart showing another method for conducting a mute operation on a cleaning device according to an exemplary embodiment.

FIG. 5 is a flow chart showing another method for conducting a mute operation on a cleaning device according to an exemplary embodiment. The method may be implemented as a set of instructions of an application in a storage medium of a hardware module. The hardware module may be implemented in an automatic cleaning device. A processor of the hardware module may communicate with the storage medium, execute the set of instructions, and perform operations of the method. The operations may include the following steps:

1) When the automatic cleaning device is initially in a mute mode, as shown in FIG. 5(*a*).

In step 502A, the hardware module obtains status information of a user.

Figure 6:
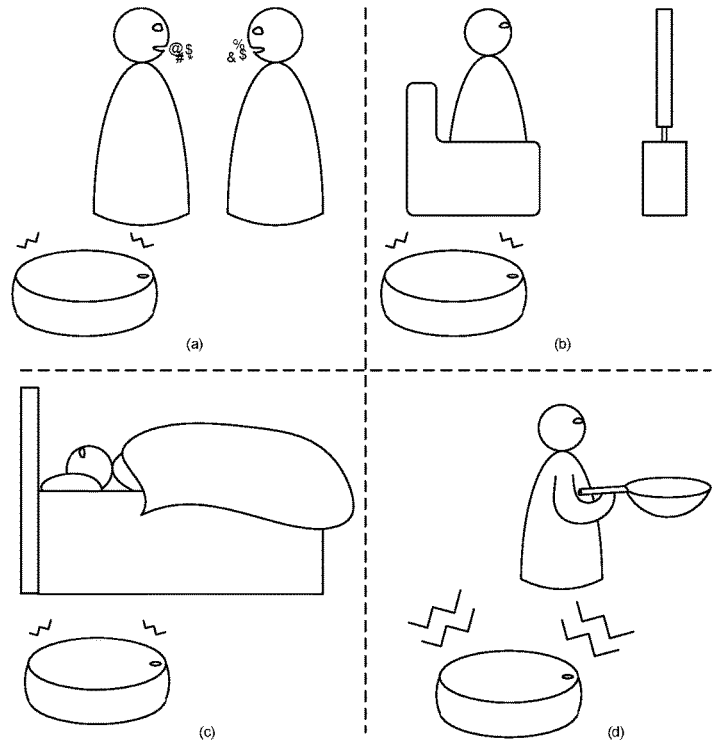
FIG. 6 is a schematic diagram illustrating a user status caused operation mode adjustment of a cleaning device according to an exemplary embodiment.

In this embodiment, the status information of the user may be obtained by various ways. For example, FIG. 6 is a schematic diagram illustrating a user status caused operation mode adjustment of a cleaning device. The user is in a "chatting" status in FIG. 6(*a*), the user is in a "watching TV" status in FIG. 6(*b*), the user is in a "resting" status in FIG. 6(*c*) and the user is in a "cooking" status in FIG. 6(*d*), so the real-time status of the user may be determined accurately based on user characteristics in each status.

For example, the hardware module may detect or obtain a noise intensity value in an environment. If the noise intensity value is small (e.g., smaller than a preset value), the hardware module may determine that the user is in the "resting" status, such that the mute mode is required. If the noise intensity value is high (e.g., higher than a preset value), the hardware module may determine that the user is in the "chatting", "watching TV" and/or "cooking" status. At this time, the location information of the user may be further considered. If the user is in a living room, the user is in the "chatting" or "watching TV" status, the user may wish to stay in a quite environment, therefore the mute mode is required. If the user is in a kitchen, the user is in the "cooking" status, the user may not be disturbed by a high noise cleaning operation, therefore the normal status is adopted.

In step 504A, the hardware module determines whether the status information of the user is in a preset status, if the status information of the user is in the preset status, the hardware module may direct the automatic cleaning device to maintain the mute mode and step 502A is executed, else step 506A is executed.

In step 506A, the hardware module switches the automatic cleaning device to a normal mode or directs the automatic cleaning device to the normal mode.

In step 508A, in the normal mode, the hardware module recovers and/or increases the operating power of the automatic cleaning device from power b to power a, or directs the automatic cleaning device to recover and/or switch its power from power b to power a.

2) If the automatic cleaning device is in a normal mode initially, as shown in FIG. 5(*b*).

In step 502B, the hardware module obtains status information of a user.

In step 504B, the hardware module determines whether the status information of the user is in a preset status, if the status information of the user is in the preset status, step 506B is executed, else the normal mode is maintained and step 502B is executed.

In step 506B, the hardware module switches the automatic cleaning device to a mute mode, or directs the automatic cleaning device to switch to the mute mode.

In step 508B, in the mute mode, the hardware module reduces the operating power of the automatic cleaning device from power a to power b, or directs the automatic cleaning device to reduce its operation power from power a to power b.

In the above-described embodiment, since in the mute mode the reduction of the operating power of the automatic cleaning device results in a reducing of a corresponding cleaning ability. Thus if the cleaning operation is still performed according to the original cleaning path, the automatic cleaning device may not be able to achieve the same cleaning effect under the normal mode. In order to achieve the same cleaning effect as in the normal mode, the hardware module may direct the automatic cleaning device to clean a floor multiple times than under the normal mode. The number of cleaning times may be determined based on the power reduction in the mute mode. The lesser power used in the mute mode, the more times may be needed for the automatic cleaning device to clean a floor in the mute mode. For example, if in the normal mode the automatic cleaning device needs only to clean the floor once, i.e., the automatic cleaning device moves along a normal cleaning path on the floor for one time, then under the mute mode, the automatic cleaning device may need to clean, e.g., passing the same cleaning path, the floor for multiple times. The number of time is determined based on the how much power the automatic cleaning device uses under the mute mode in comparison to the power used under the normal mode. For example, the number of clean may equals to a rounded value of a ration between power a and power b.

Figure 7:
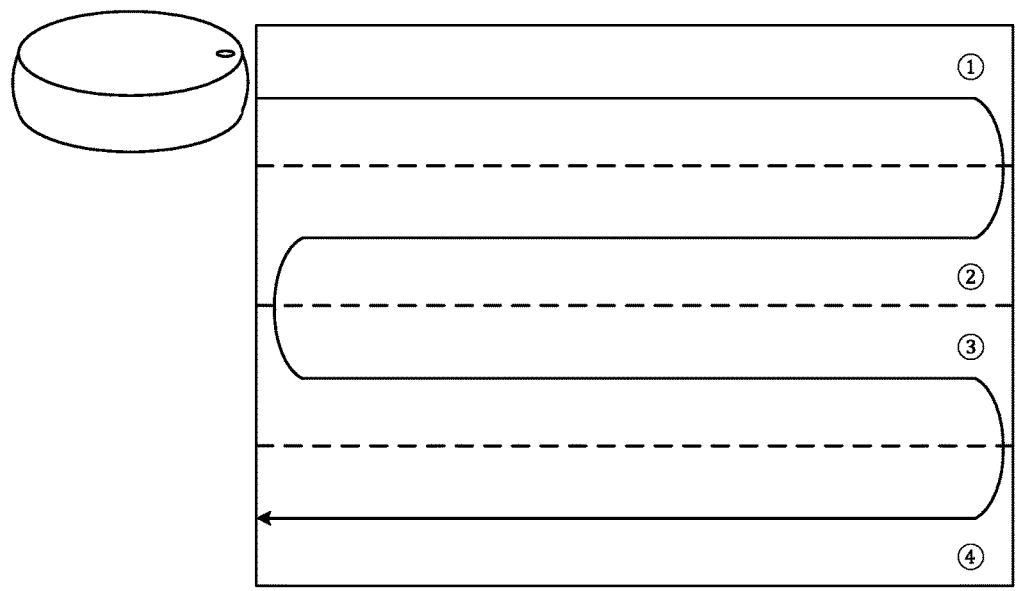
FIG. 7 is a schematic diagram illustrating a cleaning path of a cleaning device in a normal mode according to an exemplary embodiment.

For example, FIG. 7 is a schematic diagram illustrating a cleaning path of an automatic vacuum cleaning robot in a normal mode. Assuming that a longitudinal width of a room is four times as much as a vacuum cleaning width (assuming that the vacuum cleaning width is equal to a basal diameter of the automatic vacuum cleaning robot) of the automatic vacuum cleaning robot, in the normal mode, the automatic vacuum cleaning robot may divides the room into four transversal areas between the dash lines: area ①, area ②, area ③ and area ④, and a cleaning operation is performed according to the original cleaning path designated by the solid line in FIG. 7, enabling a cleaning area formed by the automatic vacuum cleaning robot to form a layer covering the entire floor of the room.

Therefore, in order to achieve an equal or better cleaning effect in the mute mode with a lower power as in the normal mode, the cleaning path may be improved, i.e. the mute cleaning path is generated according to the original cleaning path shown in FIG. 7 and a length of the mute cleaning path is larger than a length of the original cleaning path. At this time, since an area of the room and the vacuum cleaning width of the automatic vacuum cleaning robot do not change, a growth of the length of the mute cleaning path may enable the automatic vacuum cleaning robot to realize a further cleaning based on the fact that the cleaning area formed by the automatic vacuum cleaning robot forms a layer covering the entire floor of the room; in other words, the automatic vacuum cleaning robot must perform a repeat vacuum cleaning on the floor of the room to compensate a reduction of a cleaning ability due to the lower power, or even to achieve a better cleaning effect.

Figure 8A:
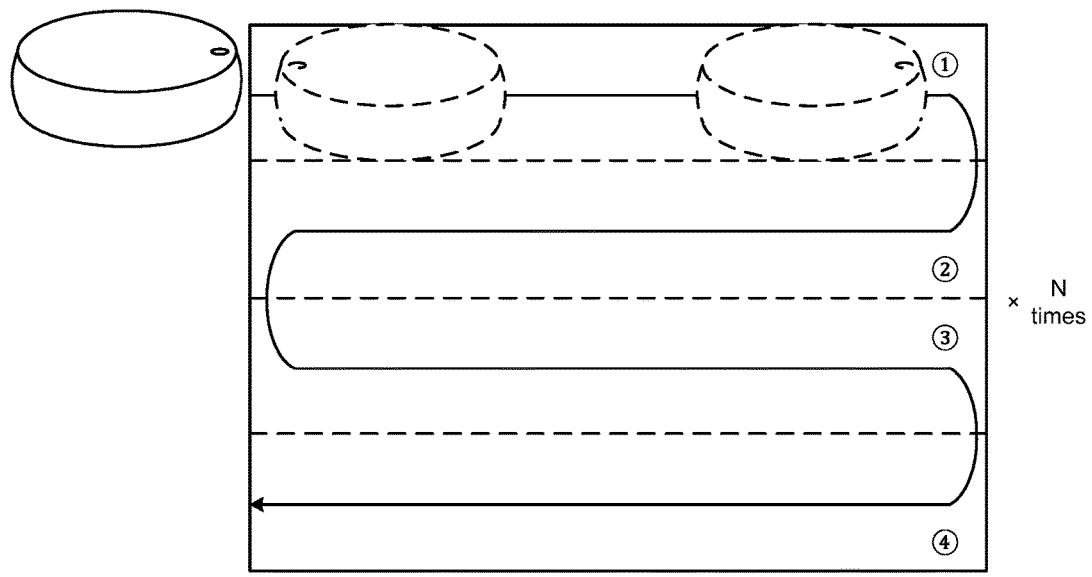
FIGS. 8A and 8B are schematic diagrams illustrating a cleaning path of the cleaning device in a mute mode according to an exemplary embodiment.

As an exemplary implementation, the hardware module may direct the automatic vacuum cleaning robot to perform a repeat combination on a preset number of original cleaning paths as the mute cleaning path. As shown in FIG. 8A, in the mute mode, the automatic vacuum cleaning robot needs to preform N times repeat cleaning operation on the room, i.e. the repeat combination may be understood in this way: the mute cleaning path may be obtained by repeating a plurality of original cleaning paths; or since a start position and an end position of the original cleaning path do not overlap, the repeat combination may be understood in this way:

The mute cleaning path=("the original cleaning path"+"a reverse original cleaning path")×M times.

Here, the reverse original cleaning path is a path is as same as that of the original cleaning path but the direction of cleaning is opposite to that of the original cleaning path. As shown in FIG. 8A, the start position of the reverse original cleaning path is a lower left corner of the room and the end position is an upper left corner of the room. Accordingly, the mute cleaning path may be a path that ("the original cleaning path"+"a reverse original cleaning path") is repeated M times.

Alternatively, if the original cleaning path corresponds to a section of sub-path within each area of the room, and then the repeat combination may be understood in this way: each section of sub-path is cleaned N times, i.e. a section of sub-path is passed through by the automatic vacuum cleaning robot for N times and then a next section of sub-path is passed through by the automatic vacuum cleaning robot for N times, until all the sub-paths are cleaned N times.

Figure 8B:
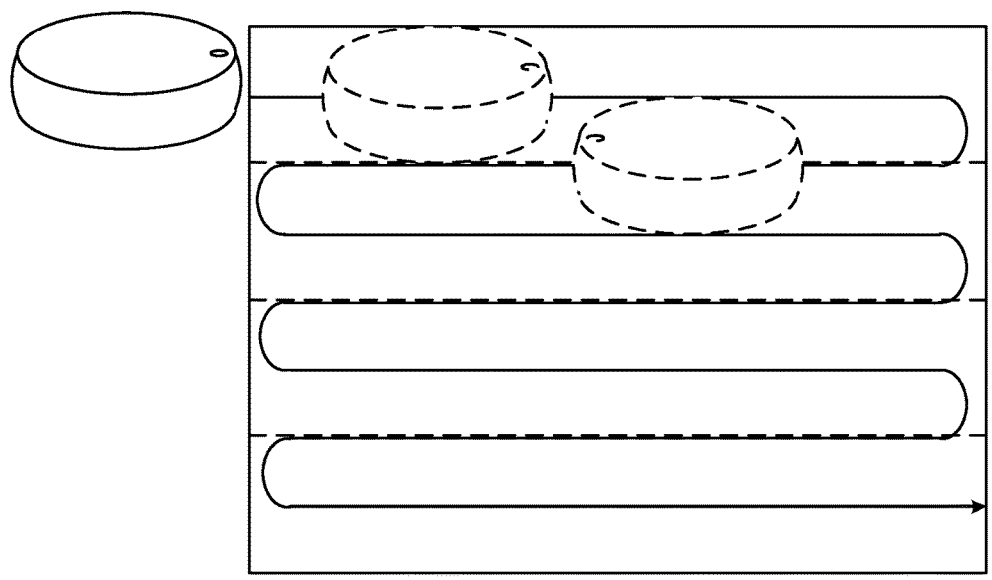

As another exemplary implementation, the mute cleaning path is generated according to a density of the original cleaning path on the floor. Here, the density reflects a degree of overlap between two adjacent sub-paths of the mute cleaning path, as shown in the solid line in FIG. 8B. The density of the mute cleaning path is higher than the density of the original cleaning path. As shown in FIG. 8B, the mute cleaning path is divided into a plurality of sub-paths in a transversal direction; the adjacent sub-paths in a longitudinal direction are denser relative to the original cleaning path. As shown in FIG. 7, a width between the adjacent sub-paths of the normal mode cleaning path is the vacuum cleaning width of the automatic vacuum cleaning robot. However, in FIGS. 8A and 8B, the width between the adjacent sub-paths is less than the vacuum cleaning width of the automatic vacuum cleaning robot, such that cleaning areas corresponding to the sub-paths are overlapping and several cleanings are performed on the same place, thus improving a cleaning effect.

Corresponding to the above-described embodiments of the method for conducting a mute operation on a cleaning device, the present disclosure also provides embodiments of the mute operation apparatus for an automatic cleaning device.

Figure 9:
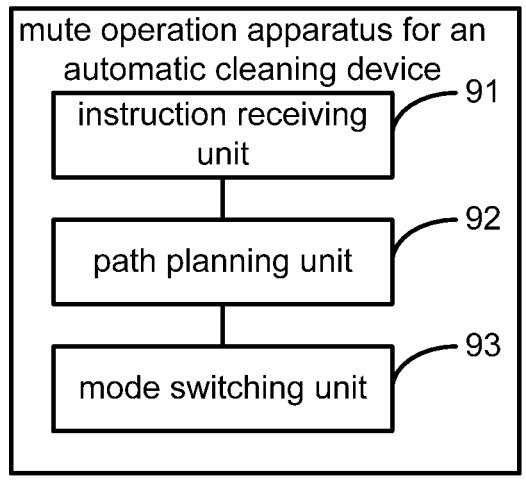
FIGS. 9, 10, 11, 12, 13, 14, and 15 are block diagrams showing mute operation apparatuses for an automatic cleaning device according to an exemplary embodiment.

FIG. 9 is a block diagram showing a mute operation apparatus for an automatic cleaning device according to an exemplary embodiment. The apparatus may be structurally similar to the device 1600 and may implement the above-introduced method for conducting mute operations by an automatic cleaning device. Further, the mute operation apparatus may include an instruction receiving unit 91, a path planning unit 92 and a mode switching unit 93.

The instruction receiving unit 91 is configured to receive a mute instruction.

The path planning unit 92 is configured to plan a mute cleaning path according to the mute instruction.

The mode switching unit 93 is configured to switch to a mute mode and to perform a cleaning operation according to the mute cleaning path.

Figure 10:
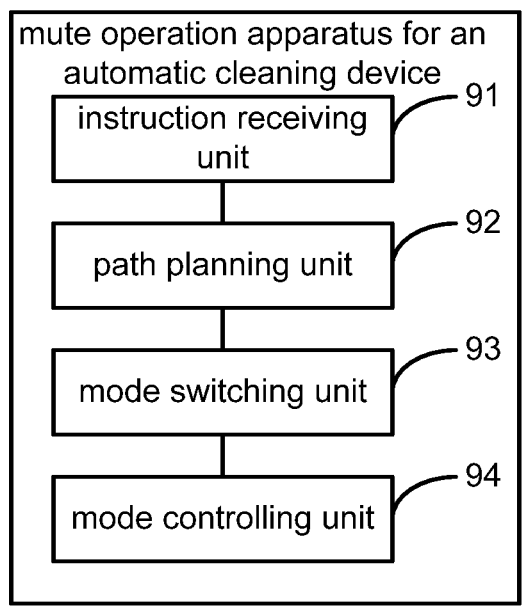

FIG. 10 is a block diagram showing another mute operation apparatus for an automatic cleaning device according to an exemplary embodiment. The embodiment is based on the above-described embodiment in FIG. 9, wherein the mute instruction is inputted by a user, and the mute operation apparatus may further include a mode controlling unit 94.

The mode controlling unit 94 is configured to return to a normal mode from the mute mode if a cancellation operation on the mute instruction form a user is detected, else to maintain the mute mode.

Figure 11:
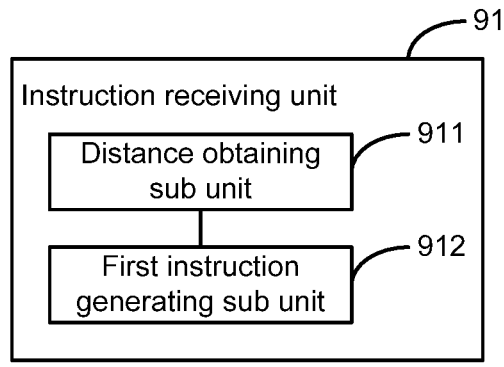

FIG. 11 is a block diagram showing another mute operation apparatus for an automatic cleaning device according to an exemplary embodiment. The embodiment is based on the above-described embodiment in FIG. 9, in which the instruction receiving unit 91 may include a distance obtaining sub unit 911, and a first instruction generating sub unit 912.

The distance obtaining sub unit 911 is configured to obtain a relative distance with respect to a user.

The first instruction generating sub unit 912 is configured to generate the mute instruction if the relative distance is less than or equal to a preset distance.

Figure 12:
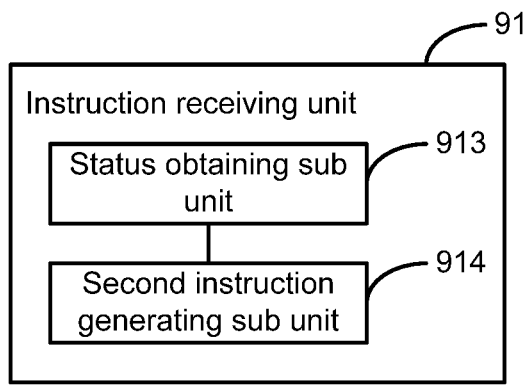

FIG. 12 is a block diagram showing another mute operation apparatus for an automatic cleaning device according to an exemplary embodiment. The embodiment is based on the above-described embodiment in FIG. 9, wherein the instruction receiving unit 91 may include a status obtaining sub unit 913 and a second instruction generating sub unit 914.

The status obtaining sub unit 913 is configured to obtain status information of a user.

The second instruction generating sub unit 914 is configured to generate the mute instruction if the user is in a preset status.

Figure 13:
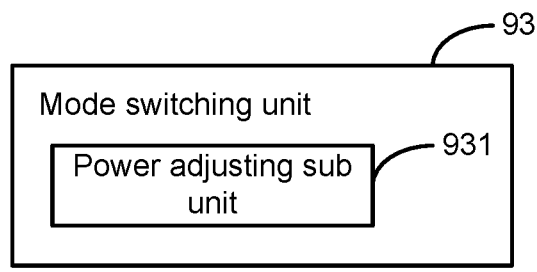

FIG. 13 is a block diagram showing another mute operation apparatus for an automatic cleaning device according to an exemplary embodiment. The embodiment is based on the above-described embodiment in FIG. 9, and the mode switching unit 93 may include a power adjusting sub unit 931.

The power adjusting sub unit 931 is configured to reduce an operating power of the automatic cleaning device to a preset value.

It may be noted that, a structure of the power adjusting sub unit 931 in the above-described embodiment shown in FIG. 13 may also be included in foregoing apparatus embodiments in FIGS. 10-12, which are not limited in the present disclosure.

Figure 14:
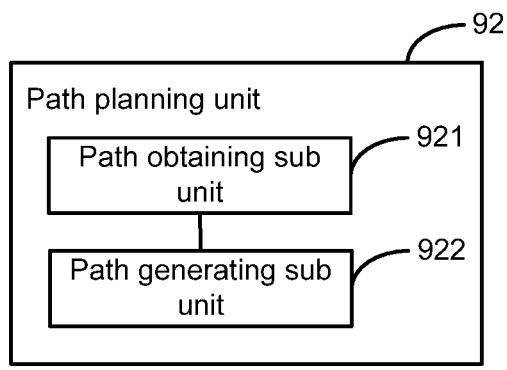

FIG. 14 is a block diagram showing another mute operation apparatus for an automatic cleaning device according to an exemplary embodiment. The embodiment is based on the above-described embodiment in FIG. 9, and the path planning unit 92 may include a path obtaining sub unit 921 and a path generating sub unit 922.

The path obtaining sub unit 921 is configured to obtain an original cleaning path.

The path generating sub unit 922 is configured to generate the mute cleaning path according to the original cleaning path, in which a length of the mute cleaning path is larger than a length of the original cleaning path.

It may be noted that, structures of the path obtaining sub unit 921 and the path generating sub unit 922 in the above-described embodiment shown in FIG. 14 may be included in foregoing apparatus embodiments in FIGS. 10-13, which are not limited in the present disclosure.

Figure 15:
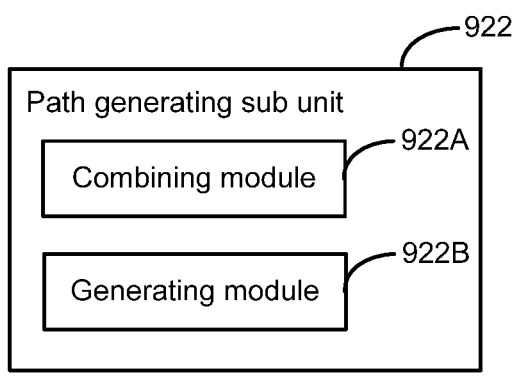

As shown in FIG. 15, in which FIG. 15 is a block diagram showing another mute operation apparatus for an automatic cleaning device according to an exemplary embodiment. The embodiment is based on the above-described embodiment in FIG. 14, and the path generating sub unit 922 may include a combining module 922A or a generating module 922B.

The combining module 922A is configured to perform a repeat combination on a preset number of original cleaning paths to obtain the mute cleaning path.

The generating module 922B is configured to generate the mute cleaning path according to an intensity of the original cleaning path, in which an intensity of the mute cleaning path is higher than the intensity of the original cleaning path.

With respect to the apparatuses in the above embodiments, the specific manners for performing operations for individual modules therein have been described in detail in the embodiments regarding the method embodiments, which are not elaborated herein again.

For the apparatus embodiments, since they substantially correspond to the method embodiments, concerning related parts of the device embodiments, reference is made to corresponding parts of the method embodiments. The above-described apparatus embodiments are merely illustrative, in which a unit as a separate component may or may not be physically separated, a component displayed as a unit may or may not be a physical unit, i.e. may be located at a place, or be distributed on multiple network units. A part or all of the modules may be selected according to practical needs so as to achieve the object of the solution of the present disclosure, which may be understood and implemented by those skilled in the art without creative labor.

Accordingly, the present disclosure also provides a mute operation apparatus for an automatic cleaning device, including: a processor; a memory for storing instructions executable by the processor; in which the processor is configured to: receive a mute instruction; path a mute cleaning path according to the mute instruction; switch to a mute mode and perform a cleaning operation according to the mute cleaning path.

Accordingly, the present disclosure also provides a terminal, and the terminal includes a memory, and one or more programs, in which the one or more programs are contained in the memory, and are configured to be executed by one or more processors, and include instructions for performing following operations of receiving a mute instruction, planning a mute cleaning path according to the mute instruction, switching to a mute mode and performing a cleaning operation according to the mute cleaning path.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A hardware module, comprising:
 a processor-readable storage medium, including a set of instructions for conducting a mute operation on a cleaning device; and
 a processor in communication with the storage medium, wherein when executing the set of instructions, the processor is directed to:
  receive a mute instruction to operate the cleaning device in a mute mode;
  determine a mute cleaning path for an a cleaning operation to clean an object according to the mute instruction;
  set the cleaning device to the mute mode; and direct the cleaning device to perform the cleaning operation on the object according to the mute cleaning path;

wherein to set the cleaning device to the mute mode, the processor is directed to reduce an operating power of the cleaning device from a first preset value to a second preset value, the first preset value corresponding to an operational power level under a normal mode of the cleaning device and the second preset value corresponding to an operational power level under the mute mode;

wherein the mute cleaning path is determined so that the cleaning device will clean the object a number of times more than the cleaning device would clean the object under the normal mode; and wherein the number of times is determined based on the second preset value;

wherein the hardware module is further directed to receive the mute instruction by:
  obtaining status information of a user according to a noise intensity value in an environment and location information of the user, and
  generating the mute instruction if the user is in a preset user status.

2. The hardware module according to claim 1, wherein, when the mute instruction is sent from a user of the cleaning device, the processor is further directed to direct the cleaning device to return to a normal mode from the mute mode only when a cancellation operation on the mute instruction is received from the user.

3. The hardware module according to claim 1, wherein the hardware module is further directed to generate the mute instruction by:
  obtaining a relative distance between the cleaning device and a user; and
  generating the mute instruction when the relative distance is less than a preset distance.

4. The hardware module according to claim 1, wherein the user is in the preset status when an activity the user is conducting indicates that the user does not wish to be disturbed.

5. A method for conducting a mute operation on a cleaning device, comprising:
  receiving, by a hardware module of a cleaning device, a mute instruction to operate the cleaning device in a mute mode;
  determining, by the hardware module, a mute cleaning path for a cleaning operation to clean an object according to the mute instruction;
  setting, by the hardware module, the cleaning device to a mute mode; and
  directing, by the hardware module the cleaning device to perform the cleaning operation on the object according to the mute cleaning path;
  wherein the setting of the cleaning device to a mute mode comprises reducing an operating power of the cleaning device from a first preset value to a second preset value, the first preset value corresponding to an operational power level under a normal mode of the cleaning device and the second preset value corresponding to an operational power level under the mute mode;
  wherein the mute cleaning path is determined so that the cleaning device will clean the object a number of times more than the cleaning device would clean the object under the normal mode; and
  wherein the number of times is determined based on the second preset value;
  wherein receiving the mute instruction comprises:
    obtaining, by the hardware module, status information of a user according to a noise intensity value in an environment and location information of the user, and
    generating, by the hardware module, the mute instruction if the user is in a preset user status.

6. The method according to claim 5, further comprising, when the mute instruction is sent from a user of the cleaning device, directing, by the hardware module, the cleaning device to return to a normal mode from the mute mode only when a cancellation operation on the mute instruction is received from the user.

7. The method according to claim 5, wherein generating, by the hardware module, the mute instruction further comprises:
  obtaining, by the hardware module, a relative distance between the cleaning device and a user; and
  generating, by the hardware module, the mute instruction when the relative distance is less than a preset distance.

8. The method according to claim 5, wherein the user is in the preset status when an activity the user is conducting indicates that the user does not wish to be disturbed.

9. A non-transitory, processor-readable storage medium, comprising a set of instructions for conducting a mute operation on a cleaning device, wherein when executed by a processor of hardware module of a cleaning device, the set of instructions directs the hardware module to perform acts of:
  receiving a mute instruction to operate the cleaning device in a mute mode;
  determining a mute cleaning path for a cleaning operation to clean an object according to the mute instruction;
  setting the cleaning device to a mute mode; and
  directing the cleaning device to perform the cleaning operation on the object according to the mute cleaning path;
  wherein the setting of the cleaning device to a mute mode comprises reducing an operating power of the cleaning device from a first preset value to a second preset value, the first preset value corresponding to an operational power level under a normal mode of the cleaning device and the second preset value corresponding to an operational power level under the mute mode;
  wherein the mute cleaning path is determined so that the cleaning device will clean the object a number of times more than the cleaning device would clean the object under a normal mode; and
  wherein the number of times is determined based on the first preset value;
  wherein receiving the mute instruction comprises:
    obtaining, by the hardware module, status information of a user according to a noise intensity value in an environment and location information of the user, and
    generating, by the hardware module, the mute instruction if the user is in a preset user status.

10. The non-transitory, processor-readable storage medium according to claim 9, wherein when the mute instruction is sent from a user of the cleaning device, the set of instructions further directs the processor to perform acts of directing the cleaning device to return to a normal mode from the mute mode only when a cancellation operation on the mute instruction is received from the user.

11. The non-transitory, processor-readable storage medium according to claim 9, wherein the set of instructions further directs the processor to perform acts of generating the mute instruction by:
   obtaining a relative distance between the cleaning device and a user; and
   generating the mute instruction when the relative distance is less than a preset distance.

12. The hardware module according to claim 1, wherein the mute cleaning path contains a number of sub-paths that is a multiple of a number of sub-paths that would occur during operation in the normal mode, such that successive sub-paths of the mute cleaning path overlap each other by an amount greater than an overlap of sub-paths that would occur during operation in the normal mode.

13. The method according to claim 5, wherein the mute cleaning path contains a number of sub-paths that is a multiple of a number of sub-paths that would occur during operation in the normal mode, such that successive sub-paths of the mute cleaning path overlap each other by an amount greater than an overlap of sub-paths that would occur during operation in the normal mode.

14. The non-transitory, processor-readable storage medium according to claim 9, wherein the mute cleaning path contains a number of sub-paths that is a multiple of a number of sub-paths that would occur during operation in the normal mode, such that successive sub-paths of the mute cleaning path overlap each other by an amount greater than an overlap of sub-paths that would occur during operation in the normal mode.

* * * * *